(12) United States Patent
N et al.

(10) Patent No.: US 11,394,266 B2
(45) Date of Patent: Jul. 19, 2022

(54) TWO DEGREE-OF-FREEDOM ELECTROMAGNETIC MACHINE

(71) Applicant: HONEYWELL INTERNATIONAL INC., Morris Plains, NJ (US)

(72) Inventors: Renukaprasad N, Bangalore (IN); Deepak Mahajan, Bangalore (IN); Govind Yadav, Bangalore (IN); Subhashree Rajagopal, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 266 days.

(21) Appl. No.: 16/860,205

(22) Filed: Apr. 28, 2020

(65) Prior Publication Data
US 2021/0242739 A1 Aug. 5, 2021

(30) Foreign Application Priority Data
Feb. 5, 2020 (IN) .............................. 202011004971

(51) Int. Cl.
| | | |
|---|---|---|
| *H02K 3/28* | (2006.01) | |
| *H02K 1/16* | (2006.01) | |
| *H02K 1/14* | (2006.01) | |
| *H02K 3/52* | (2006.01) | |
| *H02K 3/48* | (2006.01) | |
| *H02K 1/22* | (2006.01) | |

(52) U.S. Cl.
CPC ................. *H02K 3/28* (2013.01); *H02K 1/14* (2013.01); *H02K 1/165* (2013.01); *H02K 1/22* (2013.01); *H02K 3/48* (2013.01); *H02K 3/52* (2013.01); *H02K 3/521* (2013.01); *H02K 2201/18* (2013.01)

(58) Field of Classification Search
CPC ............ H02K 1/16; H02K 1/165; H02K 1/22; H02K 3/28; H02K 3/48; H02K 3/521; H02K 3/522; H02K 3/52; H02K 2201/18
USPC .................. 310/179, 180, 181, 184, 216.001
See application file for complete search history.

(56) References Cited

U.S. PATENT DOCUMENTS

| | | | |
|---|---|---|---|
| 5,280,225 A | 1/1994 | Pine et al. | |
| 5,413,010 A | 5/1995 | Nakanishi et al. | |
| 6,384,500 B1 * | 5/2002 | Chassoulier | .......... F16C 32/044 310/90.5 |
| 6,664,666 B2 | 12/2003 | Corcoran | |
| 9,391,481 B2 | 7/2016 | Kim et al. | |

(Continued)

FOREIGN PATENT DOCUMENTS

| | | |
|---|---|---|
| CN | 102075042 A | 5/2011 |
| CN | 202160025 U | 3/2012 |

(Continued)

*Primary Examiner* — Rashad H Johnson
(74) *Attorney, Agent, or Firm* — Lorenz & Kopf, LLP

(57) ABSTRACT

A two degree-of-freedom electromagnetic machine includes an inner stator, a plurality of stator windings, an outer stator, a voice coil winding, a rotor, a plurality of spin magnets, and a plurality of tilt magnets. The plurality of stator windings, when electrically energized, impart a torque on the rotor that causes the rotor to rotate, relative to the inner and outer stators, about a first rotational axis, and the voice coil winding, when electrically energized, imparts a torque on the rotor that causes the rotor to rotate, relative to the inner and outer stators, about a second rotational axis that is perpendicular to the first rotational axis.

20 Claims, 4 Drawing Sheets

(56) References Cited

U.S. PATENT DOCUMENTS

| | | | |
|---|---|---|---|
| 10,110,108 B2* | 10/2018 | Bandera | H02P 31/00 |
| 10,186,914 B2* | 1/2019 | Bandera | H02K 41/031 |
| 2004/0232790 A1 | 11/2004 | Mendenhall | |
| 2009/0230787 A1* | 9/2009 | Won | H02K 41/03 310/38 |
| 2011/0273052 A1* | 11/2011 | Long | B62J 6/06 310/208 |
| 2012/0206003 A1* | 8/2012 | Holcomb | H02K 21/029 74/DIG. 9 |
| 2015/0097460 A1* | 4/2015 | Ho | H02K 15/0435 29/598 |
| 2015/0122057 A1* | 5/2015 | Tippett | F03G 3/08 74/5.37 |
| 2017/0012482 A1* | 1/2017 | Bandera | H02K 3/28 |
| 2017/0012492 A1* | 1/2017 | Bandera | H02K 41/031 |
| 2018/0016035 A1* | 1/2018 | Bandera | B64G 1/286 |
| 2020/0021149 A1* | 1/2020 | Dai | H02K 3/28 |
| 2020/0274435 A1* | 8/2020 | Dai | H02K 1/2706 |
| 2020/0328663 A1* | 10/2020 | Medzhlumyan | H02K 3/04 |
| 2020/0343804 A1* | 10/2020 | Mahajan | H02K 1/278 |
| 2021/0006107 A1* | 1/2021 | Saxena | H02K 41/0354 |
| 2021/0021187 A1* | 1/2021 | Mahajan | H01F 7/066 |
| 2021/0184521 A1* | 6/2021 | Rajagopal | H02K 41/031 |
| 2021/0234418 A1* | 7/2021 | Mahajan | H02K 21/12 |
| 2021/0234452 A1* | 7/2021 | P.V | H02K 21/16 |
| 2022/0014085 A1* | 1/2022 | Mahajan | H02K 7/116 |

FOREIGN PATENT DOCUMENTS

| | | |
|---|---|---|
| CN | 102969849 A | 3/2013 |
| CN | 108494203 A | 9/2018 |
| CN | 108736657 A | 11/2018 |
| CN | 109728699 A | 5/2019 |
| FR | 3032570 A1 | 8/2016 |
| JP | 2006172846 A | 6/2006 |
| JP | 2007318896 A | 12/2007 |
| JP | 2012070522 A | 4/2012 |
| WO | 99/19971 A1 | 4/1999 |

* cited by examiner

TWO DEGREE-OF-FREEDOM ELECTROMAGNETIC MACHINE

CROSS REFERENCE TO RELATED APPLICATION

The present application claims benefit of prior filed Indian Provisional patent Application No. 202011004971, filed Feb. 5, 2020, which is hereby incorporated by reference herein in its entirety.

TECHNICAL FIELD

The present disclosure generally relates to spherical motors, and more particularly relates to a multi-stage spherical motor.

BACKGROUND

Recent developments in the field of UAV (Unmanned Aerial Vehicles), drones for unmanned air transport, robotics, office automation, and intelligent flexible manufacturing and assembly systems have necessitated the development of precision actuation systems with multiple degrees of freedom (DOF). Conventionally, applications that rely on multiple (DOF) motion have typically done so by using a separate motor/actuator for each axis, which results in complicated transmission systems and relatively heavy structures.

With the advent of spherical motors, there have been multiple attempts to replace the complicated multi-DOF assembly with a single spherical motor assembly. A typical spherical motor consists of a central sphere on which coils are wound, which may be orthogonally placed from each other. The sphere is surrounded by multi-pole magnets in the form of an open cylinder. The coil assembly is held axially and maintained in a vertical position via, for example, a metal post. The outer cylinder is held by a yoke/frame via a bearing, which allows the cylinder to be rotatable about its axis. The yoke is further connected to the metal post of the coil assembly via a second bearing, which allows the yoke, along with the cylinder, to be rotatable about one or two additional axes.

Unfortunately, current attempts to apply the spherical motor to the certain applications, such as UAVs and robotics, have led to several spherical motor design concepts. Unfortunately, many of these design concepts suffer certain drawbacks. For example, many have limited power density (e.g., power-to-weight ratio).

Hence, there is a need for a spherical motor that at least exhibits a power density greater than presently known spherical motors. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a two degree-of-freedom electromagnetic machine includes an inner stator, a plurality of stator windings, an outer stator, a voice coil winding, a rotor, a plurality of spin magnets, and a plurality of tilt magnets. The inner stator includes an inner stator structure and a plurality of arc-shaped stator pole shoes. The inner stator structure includes a main body and a plurality of spokes extending radially outwardly from the main body, and the spokes are spaced apart from each other to define a plurality of stator slots. Each arc-shaped stator pole shoe has an inner surface and an outer surface, and each arc-shaped stator pole shoe is connected to a different one of the spokes. The stator windings are wound around the spokes and extend through the stator slots. The outer stator surrounds at least a portion of the inner stator, and has an outer stator inner surface and an outer stator outer surface. The voice coil winding is disposed on the outer stator inner surface. The rotor is spaced apart from, and is disposed between, the inner stator and the outer stator. The rotor at least partially surrounds the inner stator and is at least partially surrounded by the outer stator. The rotor has a rotor inner surface and a rotor outer surface and is configured to rotate about a plurality of perpendicular axes. The spin magnets are coupled to the rotor inner surface, and the tilt magnets are coupled to the rotor outer surface.

In another embodiment, a two degree-of-freedom electromagnetic machine includes an inner stator, a plurality of stator windings, an outer stator, a voice coil winding, a rotor, a plurality of spin magnets, and a plurality of tilt magnets. The inner stator includes an inner stator structure and a plurality of arc-shaped stator pole shoes. The inner stator structure includes a main body and a plurality of spokes extending radially outwardly from the main body, and the spokes are spaced apart from each other to define a plurality of stator slots. Each arc-shaped stator pole shoe has an inner surface and an outer surface, and each arc-shaped stator pole shoe is connected to a different one of the spokes. The stator windings are wound around the spokes and extend through the stator slots. The outer stator surrounds at least a portion of the inner stator, and has an outer stator inner surface and an outer stator outer surface. The voice coil winding is disposed on the outer stator inner surface. The rotor is spaced apart from, and is disposed between, the inner stator and the outer stator. The rotor at least partially surrounds the inner stator and is at least partially surrounded by the outer stator. The rotor has a rotor inner surface and a rotor outer surface and is configured to rotate about a plurality of perpendicular axes. The spin magnets are coupled to the rotor inner surface, and the tilt magnets are coupled to the rotor outer surface. The arc-shape and spacing of the stator pole shoes define a spherical shape, the plurality of stator windings, when electrically energized, impart a torque on the rotor that causes the rotor to rotate, relative to the inner and outer stators, about a first rotational axis, and the voice coil winding, when electrically energized, imparts a torque on the rotor that causes the rotor to rotate, relative to the inner and outer stators, about a second rotational axis that is perpendicular to the first rotational axis.

Furthermore, other desirable features and characteristics of the two degree-of-freedom electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
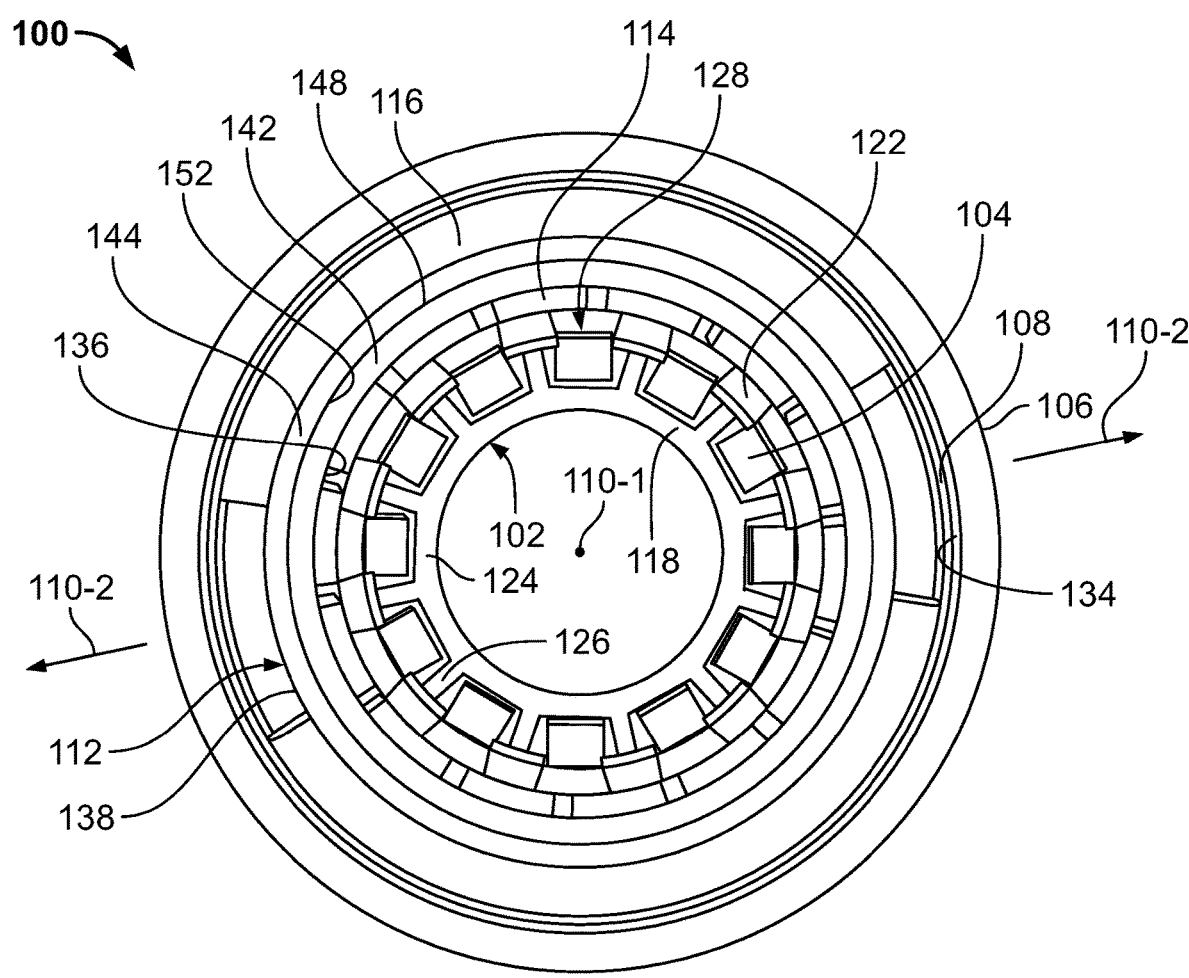
FIG. 1 depicts a top view of one embodiment of a two degree-of-freedom electromagnetic machine.
Figure 2:
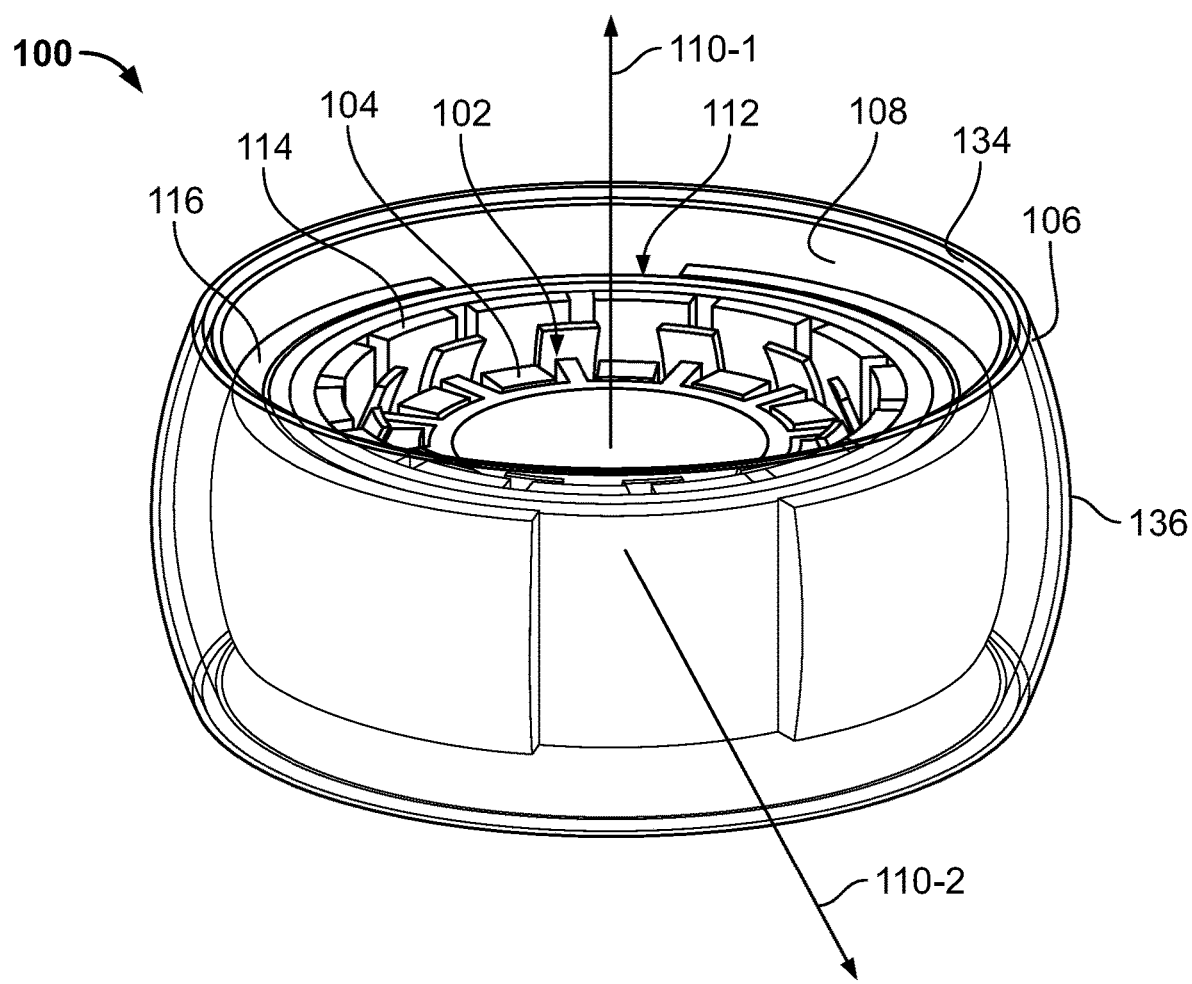
FIG. 2 depicts a plan section view of the machine of FIG. 1, with a portion thereof illustrated with transparency.

Referring to FIGS. 1 and 2, an end view and a plan view, respectively, of one example embodiment of a two degree-of-freedom electromagnetic machine 100 are depicted. Before proceeding further, it is noted that in FIG. 2 a portion of the machine 100 is, for added clarity, illustrated with transparency.

The depicted machine 100 includes an inner stator 102, a plurality of stator windings 104, an outer stator 106, a voice coil winding 108, a rotor 112, a plurality of spin magnets 114, and a plurality of tilt magnets 116. The inner stator 102 includes an inner stator structure 118 and a plurality of arc-shaped stator pole shoes 122. The inner stator structure 118 includes a main body 124 and a plurality of spokes 126. The spokes 126 extend radially outwardly from the main body 124 and are spaced apart from each other to define a plurality of stator slots 128. Each of the arc-shaped stator pole shoes 122 is connected to a different one of the spokes 126.

As FIG. 2 depicts, the arc-shape and spacing of the stator pole shoes 122 define the shape of the inner stator 102 as being at least partially spherical. In the depicted embodiment, it is seen that the inner stator 102 includes twelve arc-shaped stator pole shoes 122 and thus twelve stator slots 128. It will be appreciated, however, that the number of stator pole shoes 122 and stator slots 128 may vary and may be greater than or less than this number.

The inner stator 102 may be constructed as a unitary structure or from two or more structures. In the depicted embodiment, however, the inner stator 102 is formed as a unitary structure. The inner stator 102 is also formed of a magnetically permeable material, which provides a low reluctance path for the magnetic flux that is generated when the stator windings 104 (described momentarily) are electrically energized. The magnetically permeable material may be, for example, relatively soft magnetic solid material, steel stampings/laminations, and molds made up of soft iron powder and/or composites, just to name a few.

The stator windings 104 are wound around the spokes 126 and extend through the stator slots 128. The stator windings 104 may be wound in either concentrated or distributed fashion within the stator slots 128. In the depicted embodiment, it is noted that the stator windings 104 are wound in concentrated fractional slot-pole combinations, and the number of rotor poles (14 in the depicted embodiment) is unequal to the number of stator slots 128. The stator windings 104 are also implemented as 3-phase windings. In other embodiments, however, the stator windings 104 may be implemented with N-number of phases, where N is an integer greater than or less than three. Regardless of the number phases, the stator windings 104 are operable, upon being energized, to generate a magnetic field.

The outer stator 106 surrounds at least a portion of the inner stator 102 and has an outer stator inner surface 134 and an outer stator outer surface 136. The outer stator 106 is also at least partially spherical in shape. The outer stator 106 may be constructed as a unitary structure or from two or more structures. In the depicted embodiment, however, the outer stator 106 is formed as a unitary structure. The outer stator 106 is also formed of a magnetically permeable material, which provides a low reluctance path for the magnetic flux that is generated when the voice coil 108 (described momentarily) is electrically energized. The magnetically permeable material may be, for example, relatively soft magnetic solid material, steel stampings/laminations, and molds made up of soft iron powder and/or composites, just to name a few.

The voice coil winding 108 is disposed on the outer stator 106, and more specifically on the outer stator inner surface 134. In the depicted embodiment, the voice coil winding 108 is fixedly coupled to the outer stator inner surface 134. The voice coil winding 108 may be coupled to the outer stator inner surface via a suitable adhesive such as, for example, various epoxies, Loctite®, or any one of numerous known high-temperature glues.

The rotor 112 is spaced apart from, and is disposed between, the inner stator 102 and the outer stator 106. As such, the rotor 112 at least partially surrounds the inner stator 102 and is at least partially surrounded by the outer stator 106. The rotor has a rotor inner surface 136 and a rotor outer surface 138 and is configured to rotate, relative to the inner and outer stators 102, 106, about a plurality of perpendicular axes. In the depicted embodiment, the rotor 112 is configured to rotate about two perpendicular axes—a first rotational axis 110-1 and a second rotational axis 110-2. In other embodiments, however, the 112 could be configured to rotate about a third rotational axis.

The rotor 112 may be constructed as a unitary structure or from a plurality of structures. In the depicted embodiment, the rotor 112 is constructed of two structures—an inner rotor structure 142 and an outer rotor structure 144. The inner rotor structure 142 has an inner surface (which corresponds to the rotor inner surface 136) and an outer surface 148. The outer rotor structure 144 surrounds the inner rotor structure 142, and it too has an inner surface 152 and an outer surface (which corresponds to the rotor outer surface 138). As depicted, the inner surface 152 of the outer rotor structure 144 is coupled to the outer surface 148 of the inner rotor structure 142. The inner and outer rotor structures 142, 144 thus rotate together about one or both of the first and second rotational axes 110-1, 110-2. It will be appreciated that the inner and outer rotor structures 142, 144 may be coupled via an interference fit, via adhesive, or via other joining methods, such as welding.

The rotor 112 at least partially comprises a magnetically permeable material. That is, the rotor 112 may be comprised entirely of a magnetically permeable material or only partially of a magnetically permeable material. For those embodiments in which the rotor 112 is formed as a unitary structure, it is comprised entirely of a magnetically permeable material. For those embodiments in which the rotor 112 is formed of multiple structures, such as in the depicted embodiment, the inner rotor structure 142 comprises a magnetically permeable material, and the outer rotor structure 144 can comprise either a magnetically permeable material or a non-magnetic material. The type of material used for the outer rotor structure 144 (i.e., magnetic or non-magnetic) may depend on the type of magnets that are used to implement the tilt magnets 116, which are described below. It will be appreciated that the magnetic material used may be, for example, relatively soft magnetic solid material, steel stampings/laminations, and molds made up of soft iron powder and/or composites, just to name a few. The non-magnetic material may be, for example, aluminum or plastic, just to name a few.

The spin magnets 114 are coupled to the rotor inner surface 136, and the tilt magnets 116 are coupled to the rotor outer surface 138. Preferably, though not necessarily, the spin magnets 114 are coupled to the inner surface 136 of the rotor 112, and the tilt magnets are coupled to the rotor outer surface 138, via a suitable adhesive such as, for example, various epoxies, Loctite®, or any one of numerous known high-temperature glues.

The number and type of spin magnets 114 and tilt magnets 116 may vary. For example, multiple dipole magnets or a Halbach array may be used. In the depicted embodiment, multiple dipole magnets are used. More specifically, in the depicted embodiment, the spin magnets 114 are implemented using fourteen magnets, and the tilt magnets 116 are implemented using two magnets. It will be appreciated, however, that there could be more or less than this number of spin and tilt magnets 114, 116. Regardless of the specific number, the spin magnets 114 are preferably arranged such that the polarity of half of the spin magnets 114 relative to the inner stator 102 is opposite to the polarity of the other half of the spin magnets 114. Moreover, when implemented as dipole magnets, the tilt magnets 116 are arranged such that the polarity of half of the tilt magnets 116 relative to the outer stator 106 is opposite to the polarity of the other half of the tilt magnets 116. The spin magnets 114 are disposed such that the magnetic poles facing the stator pole shoes 122 are spaced apart therefrom by a predetermined gap, and the tilt magnets 116 are disposed such that the magnetic poles facing the voice coil 108 are spaced apart therefrom by a predetermined gap.

Before proceeding further, it was noted above that the type of material used for the outer rotor structure 144 (i.e., magnetic or non-magnetic) may depend on the type of magnets that are used to implement the tilt magnets 116. For example, when the tilt magnets are implemented using dipole magnets, the outer rotor structure 144 is preferably comprised of a magnetic material. However, when the tilt magnets 116 are implemented suing a Halbach array, the outer rotor structure 144 is preferably implemented using a non-magnetic material.

The stator windings 104, when energized, are used for spinning the rotor 112 relative to the inner and outer stators 102, 106, and the voice coil winding 108, when energized, is used for tilting the rotor 112 relative to the inner and outer stators 102, 106. That is, the stator windings 104, when energized, cause the rotor 112 to rotate, relative to the inner and outer stators 102, 106, about the first rotational axis 110-1. As may be appreciated, a non-illustrated load, such as a propeller or other device, may be coupled to the rotor 112 to receive the torque supplied therefrom. The voice coil winding 108, when energized, causes the rotor 112 (and any load coupled thereto), to rotate, relative to the inner and outer stators 102, 106, about the second rotational axis 110-2.

Figure 5:
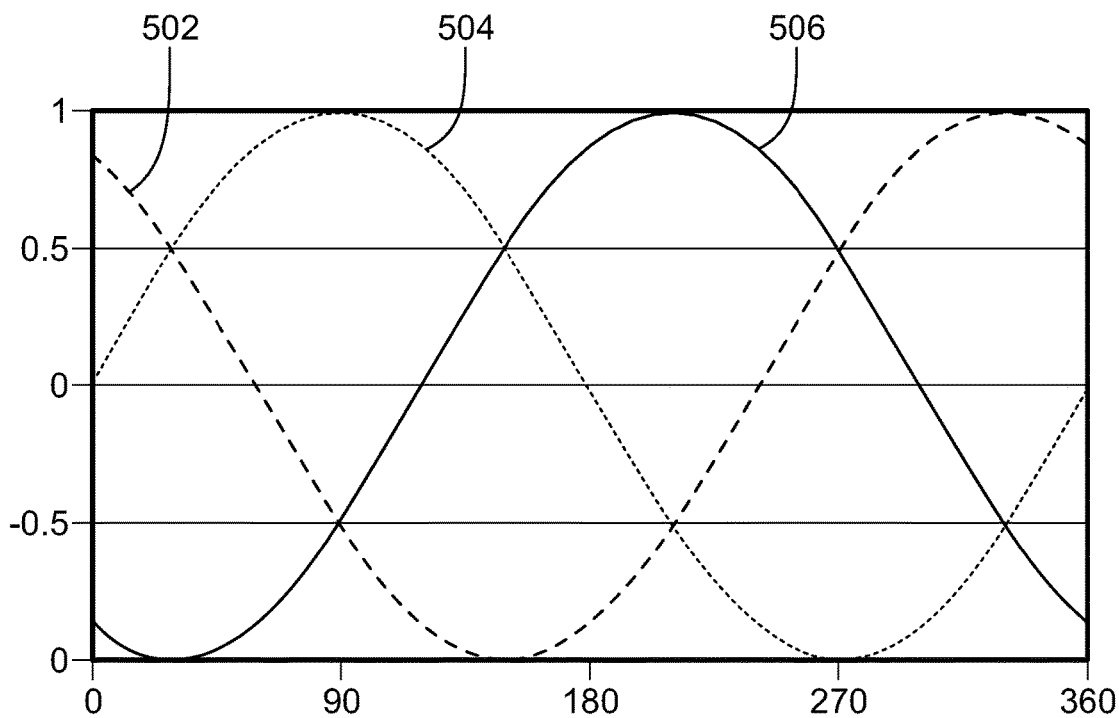
FIG. 5 depicts an example of three alternating current voltages that may be used to energize a portion of the machine depicted in FIGS. 1-4.

More specifically, when the stator windings 104 are energized with alternating current (AC) voltages, a Lorentz force is generated between the stator windings 104 and the spin magnets 114, which in turn imparts a torque to the rotor 112 that causes it to rotate, relative to the inner and outer stators 102, 106, about the first rotational axis 110-1 (e.g., spin axis). Preferably, and as FIG. 5 illustrates, the stator windings 104 are energized with a first AC voltage 502, a second AC voltage 504, and a third AC voltage 506, and the first, second, and third AC voltages 502, 504, 506 are 120-degrees (2π/3 radians) out of phase with each other. As may be appreciated, rotational speed of the rotor 112, is governed by the following equation:

$$N = \frac{(2)(f)}{P}$$

where:

N is rotational speed (in revolutions per minute) of the rotor 112, f is the electrical frequency of the supplied AC voltages (in Hz), and P is the number of poles.

Figure 3:
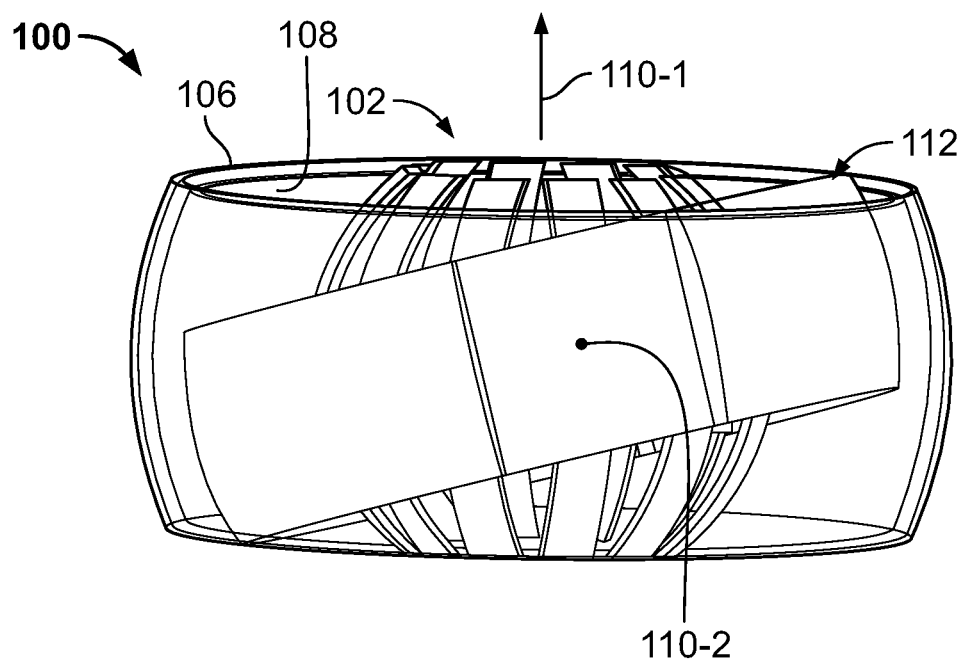
FIGS. 3 and 4 depict, in a plan view similar to that of FIG. 2, but with the rotor in a tilted position.
Figure 4:
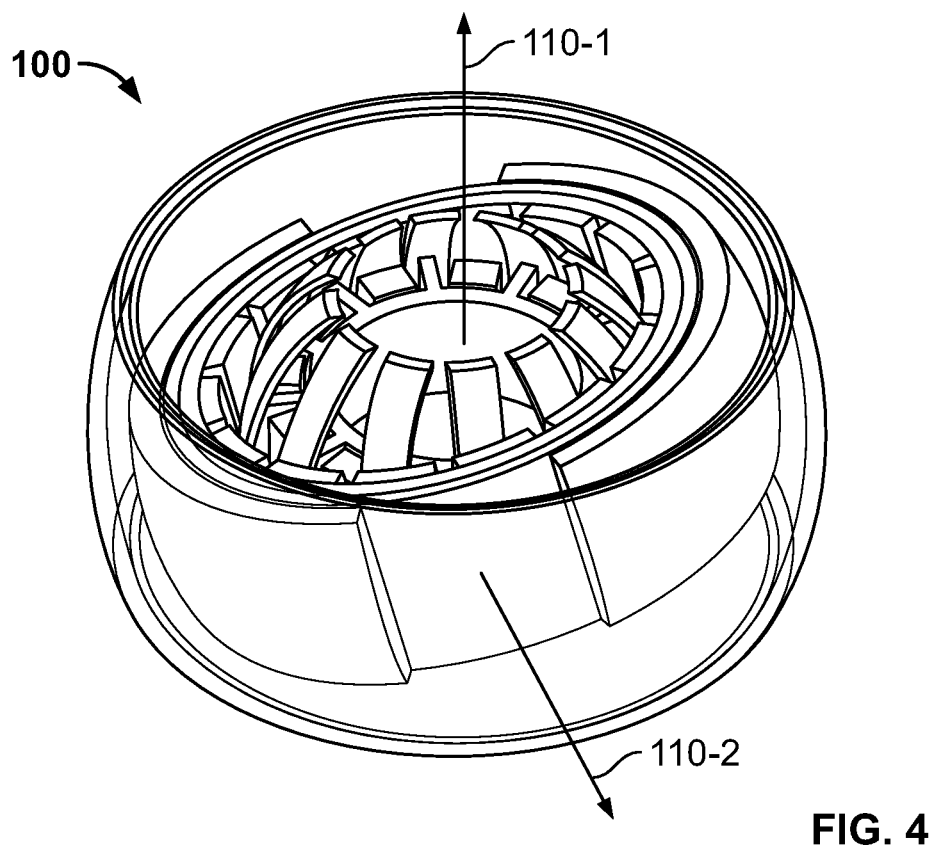

When the voice coil winding 108 is energized with an AC voltage, a Lorentz force is generated between the voice coil winding 108 and the tilt magnets 116, which imparts a torque to rotor 112 that, as FIGS. 3 and 4 depict, causes it to rotate, relative to the inner and outer stators 102, 106, about the second rotational axis 110-2 (e.g., tilt axis). The voice coil winding 108 is supplied with an excitation current (i) to achieve a desired tilt angle of the rotor 112 according to the following:

$$i = I_{tilt}(\max)*\sin(2*pi*f*\text{time})*\sin(\text{tilt\_angle})$$

where:

$I_{tilt}(\max)$ is the maximum tilt current, $\sin(2*pi*f*\text{time})$ is the spin position of the rotor 112, and $\sin(\text{tilt\_angle})$ is the desired tilt_angle (in radians) of the rotor 112.

Figure 6:
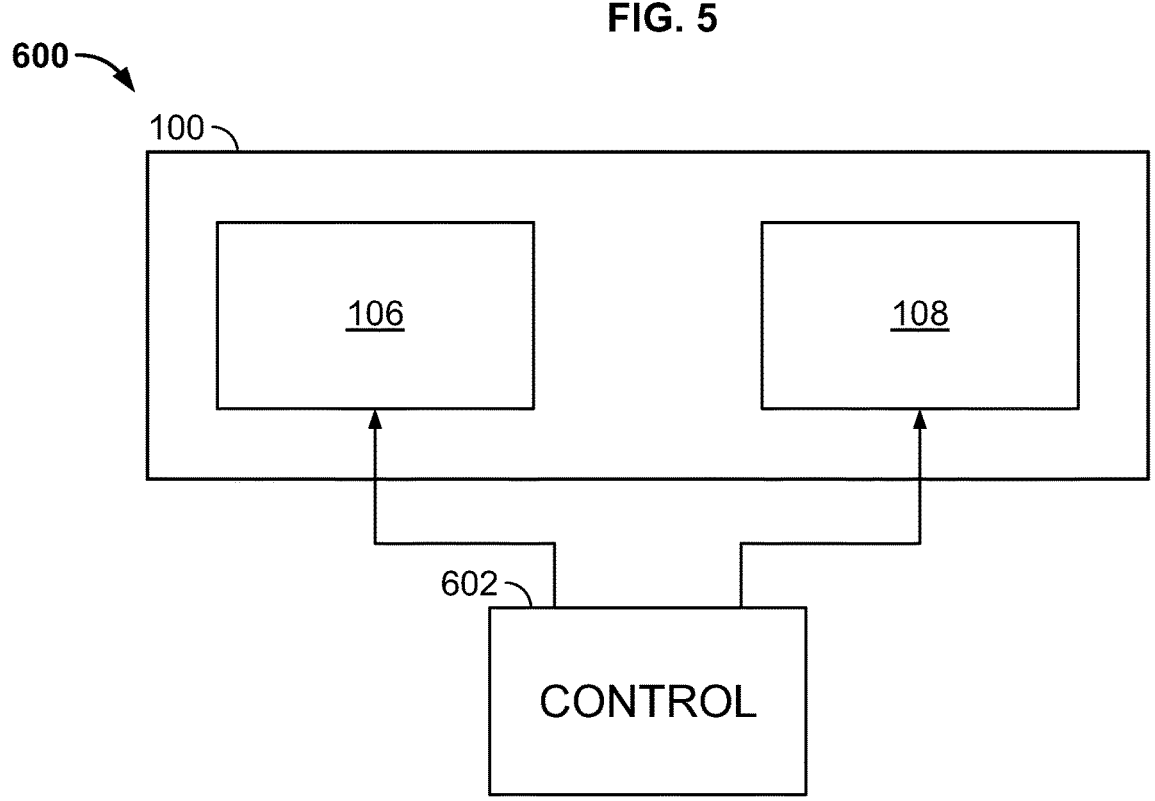
FIG. 6 depicts a functional block diagram of a two degree-of-freedom control system.

Referring now to FIG. 6, a functional block diagram of a multi-degree of freedom electromagnetic machine control system 600 that includes the machine 100 of FIGS. 1-4 is depicted. As FIG. 6 depicts, the system 600 includes a control 602 that is coupled to each of the stator windings 106 and to the voice coil winding 108. The control 602 is configured to control the current magnitudes and directions in the stator windings 106 and the voice coil winding 108 to thereby control the rotational speed and direction, and tilt direction, of the rotor 104. The control 602 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 602. Some non-limiting examples of suitable control techniques include PWM control and back EMF control.

The spherical motor embodiments disclosed herein exhibit several advantages over many presently known spherical motors. One advantage is a volumetric advantage, whereby the multi-stage configuration enables high power density spherical motor construction in a relatively small space envelope. The multi-stage spherical motor embodiments have less parts, thereby increasing overall reliability. The multi-stage spherical motor embodiments also exhibit relatively higher torque.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, magnetically electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A two degree-of-freedom electromagnetic machine, comprising:
   an inner stator comprising an inner stator structure and a plurality of arc-shaped stator pole shoes, the inner stator structure comprising a main body and a plurality of spokes extending radially outwardly from the main body, the spokes spaced apart from each other to define a plurality of stator slots, each arc-shaped stator pole shoe having an inner surface and an outer surface, each arc-shaped stator pole shoe connected to a different one of the spokes;
   a plurality of stator windings wound around the spokes extending through the stator slots;
   an outer stator surrounding at least a portion of the inner stator, the outer stator having an outer stator inner surface and an outer stator outer surface;
   a voice coil winding disposed on the outer stator inner surface;
   a rotor spaced apart from, and disposed between, the inner stator and the outer stator, the rotor at least partially surrounding the inner stator and at least partially surrounded by the outer stator, the rotor having a rotor inner surface and a rotor outer surface and configured to rotate about a plurality of perpendicular axes;
   a plurality of spin magnets coupled to the rotor inner surface; and
   a plurality of tilt magnets coupled to the rotor outer surface.

2. The machine of claim 1, wherein the arc-shape and spacing of the stator pole shoes define a spherical shape.

3. The machine of claim 1, wherein:
   the plurality of stator windings, when electrically energized, impart a torque on the rotor that causes the rotor to rotate, relative to the inner and outer stators, about a first rotational axis; and
   the voice coil winding, when electrically energized, imparts a torque on the rotor that causes the rotor to rotate, relative to the inner and outer stators, about a second rotational axis that is perpendicular to the first rotational axis.

4. The machine of claim 1, wherein the stator windings are wound in concentrated fractional slot-pole combinations.

5. The machine of claim 1, further comprising:
   a control coupled to the plurality of stator windings and to the voice coil winding, the control configured to control current magnitudes in the plurality of stator windings and in the stator voice coil winding to thereby control rotation of the rotor.

6. The machine of claim 5, wherein the control is configured to supply the stator windings and the stator voice coil winding with alternating current (AC) voltages.

7. The machine of claim 6, wherein:
   the stator windings are configured as 3-phase windings;
   the control is configured to supply the stator windings with a first AC voltage, a second AC voltage, and a third AC voltage; and
   the first, second, and third AC voltages are 120-degrees ($2\pi/3$ radians) out of phase with each other.

8. The machine of claim 1, wherein the inner stator and the outer stator each comprise a magnetically permeable material.

9. The machine of claim 1, wherein the rotor at least partially comprises a magnetically permeable material.

10. The machine of claim 1, wherein the rotor comprises:
    an inner rotor structure having an inner surface and an outer surface; and
    an outer rotor structure having an inner surface and an outer surface,
    wherein the outer rotor structure surrounds the inner rotor structure, and the inner surface of the outer rotor structure physically engages the outer surface of the inner rotor structure.

11. The machine of claim 10 wherein:
    the spin magnets are coupled to the inner surface of the inner rotor structure; and
    the tilt magnets are coupled to the outer surface of the rotor outer rotor structure.

12. The machine of claim 11, wherein:
    the spin magnets comprise a first number of dipole magnets;
    the tilt magnets comprise a second number of dipole magnets; and
    the first number is greater than the second number.

13. The machine of claim 12, wherein the inner rotor structure and the outer rotor structure each comprise a magnetically permeable material.

14. The machine of claim 10 wherein:
    the spin magnets are coupled to the inner surface of the inner rotor structure; and
    the tilt magnets are coupled to the outer surface of the rotor outer rotor structure.

15. The machine of claim 11, wherein:
the spin magnets comprise a plurality of dipole magnets;
the tilt magnets comprise a Halbach array.

16. The machine of claim 15, wherein:
the inner rotor structure comprises a magnetically permeable material; and
the outer rotor structure comprises a non-magnetic material.

17. The machine of claim 1, wherein the rotor comprises:
an inner rotor structure having an inner surface and an outer surface; and
an outer rotor structure having an inner surface and an outer surface,
wherein the outer rotor structure surrounds the inner rotor structure, and the inner surface of the outer rotor structure physically engages the outer surface of the inner rotor structure.

18. A two degree-of-freedom electromagnetic machine, comprising:
an inner stator comprising an inner stator structure and a plurality of arc-shaped stator pole shoes, the inner stator structure comprising a main body and a plurality of spokes extending radially outwardly from the main body, the spokes spaced apart from each other to define a plurality of stator slots, each arc-shaped stator pole shoe having an inner surface and an outer surface, each arc-shaped stator pole shoe connected to a different one of the spokes;
a plurality of stator windings wound around the spokes extending through the stator slots;
an outer stator surrounding at least a portion of the inner stator, the outer stator having an outer stator inner surface and an outer stator outer surface;
a voice coil winding disposed on the outer stator inner surface;
a rotor spaced apart from, and disposed between, the inner stator and the outer stator, the rotor at least partially surrounding the inner stator and at least partially surrounded by the outer stator, the rotor having a rotor inner surface and a rotor outer surface and configured to rotate about a plurality of perpendicular axes;
a plurality of spin magnets coupled to the rotor inner surface; and
a plurality of tilt magnets coupled to the rotor outer surface,
wherein:
the arc-shape and spacing of the stator pole shoes define a spherical shape,
the plurality of stator windings, when electrically energized, impart a torque on the rotor that causes the rotor to rotate, relative to the inner and outer stators, about a first rotational axis, and
the voice coil winding, when electrically energized, imparts a torque on the rotor that causes the rotor to rotate, relative to the inner and outer stators, about a second rotational axis that is perpendicular to the first rotational axis.

19. The machine of claim 18, further comprising:
a control coupled to the plurality of stator windings and to the voice coil winding, the control configured to control current magnitudes in the plurality of stator windings and in the stator voice coil winding to thereby control rotation of the rotor.

20. The machine of claim 19, wherein:
the stator windings are configured as 3-phase windings;
the control is configured to supply the stator windings with a first AC voltage, a second AC voltage, and a third AC voltage, respectively; and
the first, second, and third AC voltages are 120-degrees ($2\pi/3$ radians) out of phase with each other.

\* \* \* \* \*